PRIOR ART TREATMENT

United States Patent Office 3,397,130
Patented Aug. 13, 1968

3,397,130
PROCESS FOR MANGANESE RECOVERY
FROM LEACH SOLUTIONS
Francis E. Brantley, Bowie, Md., and Carl Rampacek, Arlington, Va., assignors to the United States of America as represented by the Secretary of the Interior
Filed Oct. 20, 1965, Ser. No. 499,115
7 Claims. (Cl. 204—105)

The invention herein described and claimed may be manufactured and used by or for the Government of the United States of America for governmental purposes without the payment of royalties thereon or therefor.

This invention relates to an improved process for recovering manganese and iron values from low-grade manganiferous ores.

A well known method for removing manganese and iron from low-grade manganiferous ores involves leaching the ores with waste pickle liquors (weak ferrous sulfate-sulfuric acid solutions) from the steel industry. One of the better techniques for separating the manganese and iron from the resultant leach liquor involves a leach-electrolysis cyclic operation wherein iron and impurities are removed from the liquor, and, subsequently, manganese is electrolytically removed, the resultant electrolytic cell anolyte being recycled to the leaching step as the leaching medium. Heretofore, the iron and impurities generally have been removed in this type operation by chemical precipitations through the addition of sulfide ions, a pH adjuster and oxidants such as $H_2O_2$. These steps involve the subsequent removal of ferrous sulfide and ferric hydroxide, both of which present filtration problems. In addition, any silica extracted from the ore may form as a gel during precipitation to further complicate filtration. Furthermore, in the leach-electrolysis cyclic operation, before the usual electrolytic pretreatment (such as the addition of 120–140 grams of ammonium sulfate per liter) of the iron-free, impurity-free manganese-containing leach liquor, the leach liquor must contain at least 30 to 40 grams of manganese per liter of leach liquor in order to give satisfactory manganese electrodeposition results. Since such leach liquor from low-grade manganiferous materials under favorable circumstances contain as low as 8 grams of manganese per liter, a tedious concentration operation is required prior to electrolysis.

An object of this invention is to provide a method for more readily separating iron and manganese from a pregnant leach liquor resulting from leaching manganiferous ores in a leach-electrolysis cyclic operation. More specifically, this object is to provide a method for precipitating iron compounds from the liquor in readily filtrable form, and simultaneously precipitating manganese compounds from the liquor, which total precipitate can be easily treated to separate the iron in product form from the manganese compounds and, at the same time, to prepare the manganese compound in a concentration ready for electrolytic treatment.

A further object of this invention is to provide a method for precipitating manganese from leach liquors resulting from leaching manganese-containing ores, which liquors contain ammonium and sulfate ions.

The invention is based on the discovery that an ammonium-manganese complex, $(NH_4)_2Mn_2(SO_4)_3$, forms as a precipitate under high temperatures and pressures in a leach liquor containing manganese and ammonium sulfate, even in the presence of free sulfuric acid.

For a more detailed understanding of the invention and for further objects and advantages thereof, reference is to be had to the accompanying drawing in which.

Figure 1:
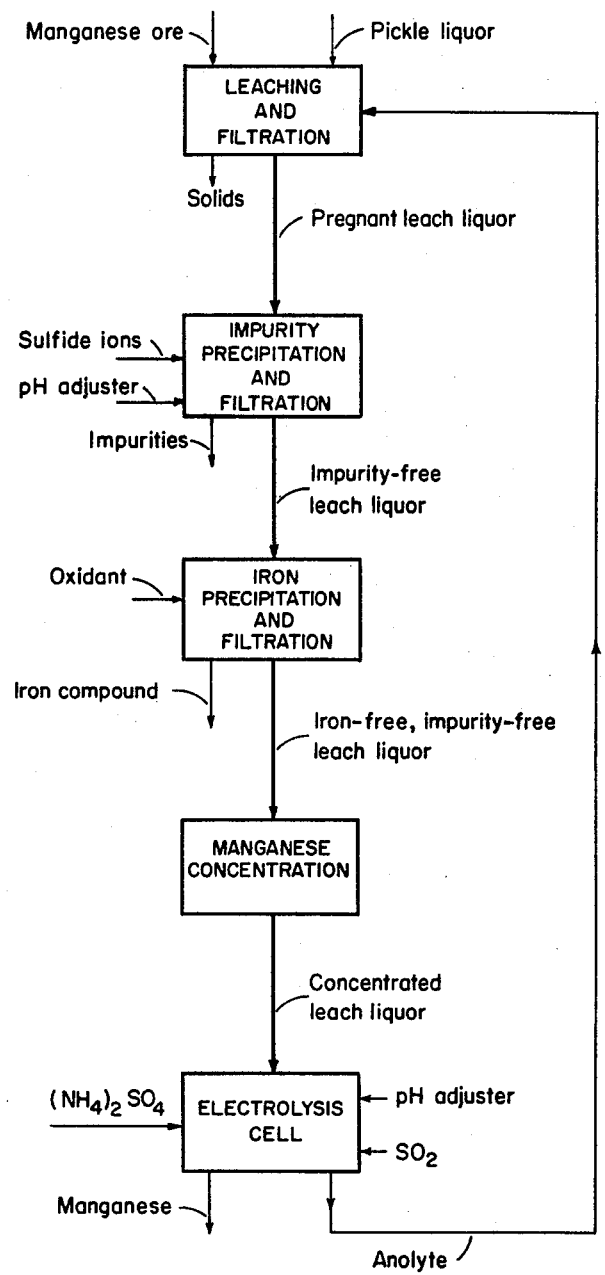
FIG. 1 shows a schematic diagram of a conventional cyclic leach-electrolysis operation.

In a conventional cyclic operation, shown in FIG. 1, pregnant leach liquor from the leach-filtration step is chemically treated in a plurality of steps with sulfide ions, a pH adjuster and oxidant to precipitate iron and impurities from the liquor in the form of sulfides and hydroxides. Iron-free, impurity-free liquor is then concentrated down to the required manganese-liquor ratio for the electrolytic feed, and the usual required amounts of ammonium sulfate (along with a pH adjuster and $SO_2$) are added to effect electrodeposition of managanese in the cell. Cell anolyte is then recycled to the leaching step, and ferrous sulfate and sulfuric acid in the form of waste pickle liquor are added, when necessary, to restore the leaching medium to proper strength. Ammonium sulfate, added in the electrolysis step, remains in the anolyte leaching medium, but has no apparent effect upon leaching efficiency.

Figure 2:
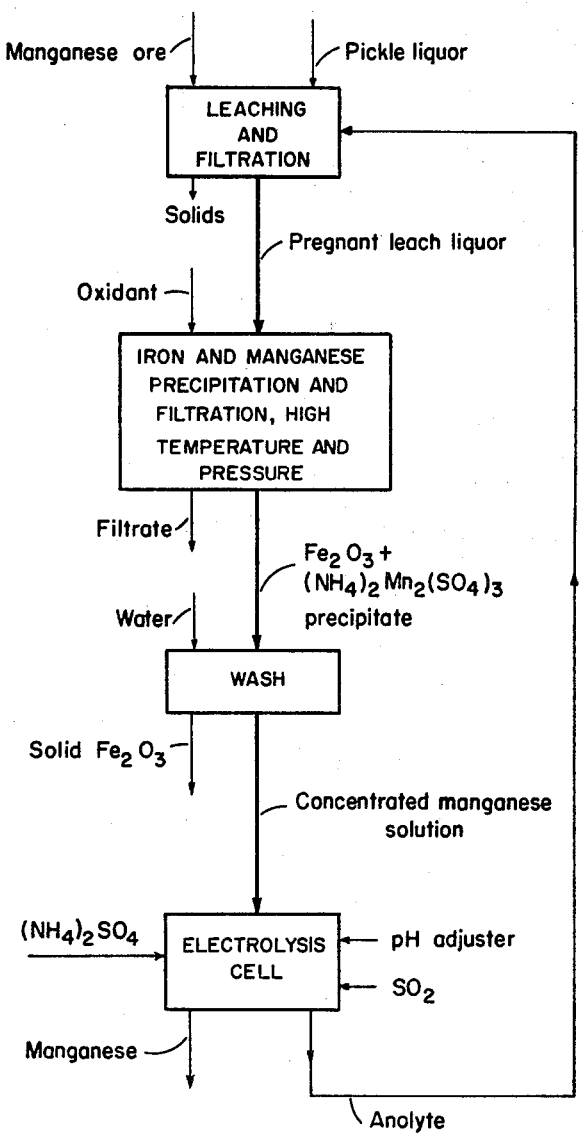
FIG. 2 shows a schematic diagram of a cyclic leach-electrolysis operation embodying the present invention.

In a system embodying the present invention, as shown in FIG. 2, only an oxidant in the form of, for example, $H_2O_2$ or oxygen is added to the precipitation step. The precipitation is further carried out under high temperatures and pressures in, for example, an autoclave. Under these conditions both an iron compound and a manganese compound precipitate from the liquor. The iron precipitates as almost 100 percent $Fe_2O_3$ while the manganese precipitates as an ammonium-manganese complex

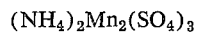

$$(NH_4)_2Mn_2(SO_4)_3$$

The free sulfuric acid present in the liquor does not retain the manganese in solution if sufficient $(NH_4^+)$ is present to form the complex.

The precipitates are readily removed from the liquor by filtration under the precipitation temperature and pressure. These are further treated under ambient conditions to separate the metals from one another by merely adding water thereto. Since the iron compound is relatively insoluble in water and the manganese compound is highly soluble, the water extracts the manganese compound leaving behind relatively pure ferric oxide, $Fe_2O_3$. Further treatment of the $Fe_2O_3$ is well known to those experienced in the art depending upon the desired use of the compound.

Water is added in such an amount to the precipitates to prepare a properly concentrated electrolyte feed (e.g., 30–40 grams of manganese per liter). The usual amounts of pH adjuster and $SO_2$ are then added to the electrolyte feed along with additional ammonium sulfate, if necessary, to bring the ammonium sulfate content up to that which is required for proper electrolysis (120–140 grams per liter).

The iron and manganese leached from the ore can be precipitated out almost 100% from the leach liquor at a temperature of 250° C. to 260° C. under the pressure which the resultant saturated steam evolved from the liquor at the operating temperature exerts in a closed vessel such as an autoclave (e.g., 250° C., 578 p.s.i.a.), the operation being carried on from 5 to 60 minutes. A temperature range of from 200° C. to 300° C. or more (depending upon the operating equipment pressure and temperature capabilities) could be employed, but less than 100% precipitation would be achieved at temperatures much below 250° C., and temperatures much higher than 260° C. would not be desirable from an economic standpoint.

Oxidizing agents such as oxygen and $H_2O_2$ may be used. If oxygen is utilized, it must be supplied at a pressure in excess of that exerted by the saturated steam pressure of the liquor under operating temperatures. The oxidant can be added to the leach liquor in an amount only slightly in excess of that required to convert the ferrous compounds in the leach liquor to ferric compounds.

Any commercial autoclave designed to withstand operating temperatures and pressures would be satisfactory for the process. Construction should be of noncorrosive metal or glass-lined steel with provision for filtration under pressure.

The inverse solubility property of the ammonium-manganese complex, $(NH_4)_2Mn_2(SO_4)_3$, formed even in the presence of free acid accounts for the ability of this complex to precipitate out of solution at high temperatures and pressures.

The following examples illustrate the invention:

Example 1

A synthetic aqueous solution was prepared containing in grams per liter of Mn—29.8, and $(NH_4)_2SO_4$—140. This solution was placed in a Parr pressure apparatus, heated to 225° C. under 370 p.s.i.a. and held under these conditions for 1 hour. The solution was then filtered at this temperature and pressure. On analysis the filtrate was found to contain 1.8 grams Mn and 84.7 grams $SO_4^-$ per liter. X-ray diffraction analysis showed the residue to be $(NH_4)_2Mn_2(SO_4)_3$. This residue, representing 94 percent of the Mn originally contained in the solution was redissolved in water to give approximately 35 grams per liter Mn. After pH adjustment and proper additions of $SO_2$ and $(NH_4)_2SO_4$, the solution was used as feed to an electrolysis cell to obtain an adherent deposit of manganese on a titanium cathode.

Example 2

Pregnant leach liquor was obtained from a pilot plant leaching operation in which a cyclic leach circuit was simulated. The initial leach solution, containing $$(NH_4)_2SO_4$$

represented anolyte of average composition from a manganese electrolytic cell and, in addition, had been restored to proper leach strength (e.g., .5–10% $H_2SO_4$, 8–20% ferrous sulfate) with ferrous sulfate and sulfuric acid. It was then used to leach a Georgia umber. Analysis of the resulting leach liquor showed in grams per liter, Mn—26.6, $(NH_4)_2SO_4$—119.1, $Fe^{+2}$—7.5, $Fe^{+3}$—8.8, Fe total—16.3, and free $H_2SO_4$—8.0. A 1 liter sample of this liquor was placed in an autoclave, 7 cc. of a 60% solution of $H_2O_2$ were added to oxidize the ferrous iron, and the autoclave then heated to 250° C. After being held at this temperature and a pressure of 578 p.s.i.a. for 30 minutes, the contents were filtered at this temperature and pressure. Filtrate analysis showed in grams per liter, Mn 1.4 and Fe total 1.7, or 95 percent removal of the manganese and 90 percent removal of the iron as a residue which consisted of ferric oxide and $(NH_4)_2Mn_2(SO_4)_3$. A simple water leach of this residue followed by filtration separated the insoluble iron oxide from the soluble manganese salt.

The present invention eliminates complexities such as silica gel formation involved during leach-electrolysis cyclic operations when precipitating iron from pregnant manganiferous ore leach liquor, eliminates the additional step of removing impurities from the leach liquor to prepare the manganese-containing electrolyte feed, and eliminates the concentration step associated with preparing the manganese-containing electrolyte feed. Furthermore, the invention offers a relatively simple method of removing manganese (and iron, if present) from leach liquors containing manganese and ammonium sulfate.

Although the particular process is well adapted to carry out the objects of the present invention, it is to be understood that various modifications and changes may be made all coming within the scope of the following claims.

What is claimed is:

1. A process for separating a manganese compound from pregnant leach liquor resulting from leaching a manganese-containing ore with a leach solution containing ammonium sulfate which comprises heating said liquor to at least 200° C. under a pressure of about saturated steam pressure at the temperature to which said liquor has been heated, maintaining said temperature and pressure for a period of time sufficient to allow the precipitation of a manganese-ammonium complex, $$(NH_4)_2Mn_2(SO_4)_3$$

and separating said precipitate from remaining liquor while said remaining liquor is maintained at the precipitation temperature and pressure.

2. The process of claim 1 wherein said precipitation temperature is at least 250° C.

3. A process for separating iron and manganese compounds from pregnant leach liquor resulting from leaching manganiferous ores with a leach solution containing ferrous sulfate, sulfuric acid and ammonium sulfate which comprises heating said liquor to at least 200° C., in the presence of an oxidizing agent, under a pressure of about saturated steam pressure at the temperature to which said liquor has been heated, maintaining said temperature and pressure for a period of time sufficient to allow the precipitation of ferric oxide and a manganese-ammonium complex, $(NH_4)_2Mn_2(SO_4)_3$, and separating said precipitate from remaining liquor while said remaining liquor is maintained at the precipitation temperature and pressure.

4. The process of claim 3 wherein said precipitation temperature is at least 250° C.

5. The process of claim 4 wherein said precipitate is separated from said liquor by filtration, said separated precipitate is washed with water to dissolve said complex therein, and resultant wash water containing said complex is separated from ferric oxide precipitate.

6. The process of claim 5 wherein said separated resultant wash water is subjected to electrolysis to remove manganese therefrom.

7. The process of claim 6 wherein a leach-electrolysis cyclic operation is established by continuously subjecting fresh manganiferous ore to said leaching, precipitation, washing and electrolysis steps, and utilizing anolyte resulting from said electrolysis steps as the leaching medium for said fresh ore.

References Cited

UNITED STATES PATENTS

| | | | |
|---|---|---|---|
| 2,176,774 | 10/1939 | Sweet et al. | 75—115 |
| 2,608,463 | 8/1952 | Dean | 23—51 |
| 2,717,870 | 9/1955 | Dean | 204—45 |
| 2,766,197 | 10/1956 | Carosella | 204—105 |

OTHER REFERENCES

Behr, A.: Electrolytic Production of Manganese, The Metal Industry, Mar. 22, 1940, pp. 273–4.

HOWARD S. WILLIAMS, *Primary Examiner.*

H. M. FLOURNOY, *Assistant Examiner.*